Patented July 8, 1924.

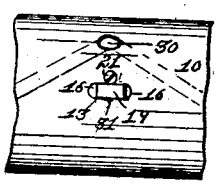

1,500,355

UNITED STATES PATENT OFFICE.

ROY V. YEAGER, OF DES MOINES, IOWA.

FORCE-FEED LUBRICATING DEVICE.

Application filed July 10, 1923. Serial No. 650,617.

*To all whom it may concern:*

Be it known that I, ROY V. YEAGER, a citizen of the United States, and a resident of Des Moines, in the county of Polk, State of Iowa, have invented a certain new and useful Force-Feed Lubricating Device, of which the following is a specification.

The object of my invention is to provide a device of simple, durable and inexpensive construction, especially designed for use in connection with engine crank shafts of the kind ordinarily employed in internal combustion engines for the purpose of forcing lubricating oil into those portions of the shaft bearings which it is difficult and sometimes impossible to thoroughly lubricate, and to the cylinders.

More specifically it is my object to provide a device of this character in which friction of the metal working parts of the device, such as would tend to rapidly wear them, is almost wholly overcome, and hence the working parts need not be removed for repair or replacement.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of a portion of an engine crank shaft and the stationary bearing for part of it, the latter being shown in section and being provided with an annular groove to receive the force feed blade, the crank shaft being shown as provided with an oil passageway to the crank bearings.

Figure 2 shows a central, transverse, sectional view of a crank shaft and supporting bearings having my improvement applied thereto.

Figure 3 shows a similar view with the force feed blade in a position adjacent to the stationary guiding cam.

Figure 4 shows a like view showing the force feed blade in position after it has passed the guide cam.

Figure 5 shows a perspective view of the force feed blade detached.

Figure 6 shows a plan view of a portion of the crank shaft with the force feed blade in position therein; and Figure 7 shows a detail view illustrating the groove and guide cam in one of the bearings members.

Referring to the accompanying drawings, I have used the reference numeral 10 to indicate the body of an engine crank shaft, 11 the crank arms and 12 the bearing members thereof, which are designed to receive the pitman for the piston. This crank shaft is of the ordinary construction.

Formed in the body portion 10 of the crank shaft is a recess 13. Mounted within the recess 13 is a force feed blade comprising a body portion 15 having two rounded guide members 16 and a central projection 17. These rounded guide members are designed to enter rounded openings in the part 10, and the projection 17 is designed to receive an extensible coil spring 18.

The outer or working face of the force feed blade is preferably beveled or inclined as shown at 19, and I have provided means for limiting the outward movement of the blade 15 as follows:

20 indicates a pin fixed to the blade and 21 indicates a set screw seated in the shaft 10 and designed to engage said pin to limit the outward movement of the blade.

The bearing for the shaft member 10 comprises a stationary bearing member 22 and a removable bearing member 23, the latter being held in position by the nuts 24 on the bolts 25, and the bearing members are preferably provided along a central line relative to the shaft member 10. The portions of both bearing members that are adjacent to the shaft member 10 are preferably lined with Babbitt metal 26, and this Babbitt metal lining is formed with an annular groove 27 substantially the same width as the width of the blade 15.

Communicating with this annular groove or oil chamber 27 is an oil supply pipe 28, and adjacent to the oil supply pipe there is a cam shaped guide device 29 having its inner face projected toward the shaft member 10, as close as it is possible to make it without actually touching. This cam device is of the same width as that of the groove or oil chamber 27, and is made of a separate piece of metal and held in place by the bolt 25 and the nut 24, as clearly shown in Figures 4 and 7. Communicating with this oil chamber 27 are oil passageways 14 extending to points of discharge at the crank bearing members 12, and the passageways 14ª extend through the stationary crank bearing member to any desirable point such for instance as the interior of the engine cylinder not shown.

As shown in the drawings, Figures 2, 3, and 4, the shaft member 10 is designed to rotate in a clockwise direction and formed in the shaft a short distance in advance of the force feed blade is a groove or depression 30 which communicates with the oil passageways 14, as shown in Figure 6, and also by dotted lines in Figure 4. For the purpose of preventing the accumulation of oil in the recess in which the force feed blade is mounted, I provide a miniature passageway indicated by the numeral 31 in the shaft member 10 leading from the bottom of said recess to the exterior of the shaft on the side of the force feed blade opposite its advance side.

In practical operation and assuming that the shaft member 10, as shown in Figures 2, 3 and 4, is rotated in a clockwise direction, then after the force feed blade passes the inlet pipe 28, the oil contained between the force feed blade and the cam guide 29 will be forced to travel out through the notch 30 and the passageways 14 and 14ª until the force feed blade reaches the position shown in Fig. 4, or passes the cam guide 29.

Assuming that the device is being operated without oil, then during the major part of its movement, the outer edge of the force feed blade would stand close to the interior of the annular groove in which it is mounted, but its outer edge would not frictionally engage the metal forming the outer boundary of said groove, hence there will be no friction at this point. Under the same condition, however, the outer end of the force feed blade would, upon each revolution, violently strike upon the cam guide, and this would cause wear and friction and rapid deterioration of the parts so they would have to be repaired or replaced at frequent intervals. However, by having the notch 30 spaced apart from the force feed blade and in advance of it, then when the notch 30 passes the highest point of the cam shaped guide 29, as shown in Figure 3, the oil that is contained in the groove 27 between the notch 30 and the force feed blade cannot escape, and is substantially non-compressible, hence, when in the position shown in Figure 3, the oil itself will act upon the inclined surface of the force feed blade and press the force feed blade toward the center of the shaft member 10 before the force feed blade can strike the cam guide, and this will prevent the metal parts of the force feed blade and the cam guide from striking at this point. As soon as the force feed blade passes the highest point of the cam guide, as shown in Figure 4, then the spring will force the blade again to its outer limit of movement.

By this arrangement the outer end of the force feed blade never comes into frictional contact with any of the metal parts, and it is prevented from engaging the Babbitt metal by means of the screw 21, and it is prevented from engaging the cam guide by means of the oil cushion. There will, of course, be some slight leakage of oil past the outer end of the blade during its progress, and there will be a slight leakage of oil between the cam guide 29 and the adjacent surface of the shaft 10, but for the purpose for which this device is intended, this leakage is not a disadvantage and the device when in use will exert a sufficient pressure upon the oil to force it outwardly through the grooves 14 in desired quantities.

I claim as my invention:

1. A device of the class described comprising a rotatable shaft, a bearing in which the rotatable shaft is mounted, an annular groove formed in said bearing, a force feed blade mounted in the shaft, there being a passageway leading from the groove to conduct oil to a point of discharge, and a cam guide projecting into said groove in the path of the force feed blade, for the purposes stated.

2. A force feed lubricating device comprising in combination a shaft, a bearing in which the shaft is mounted, there being an annular groove between the bearing and the shaft, a force feed blade slidingly mounted in the shaft to project into said groove, a spring for normally holding it outwardly, means for limiting its outward movement, the outer end of said blade being beveled or inclined in a direction outwardly relative to the shaft from its advance side, and a cam guide mounted in the bearing and projected into said annular groove, there being a passageway formed in the shaft at a point slightly spaced apart from the force feed blade on the advance side thereof, and means for admitting oil into said groove, for the purposes stated.

3. A force feed lubricating device comprising in combination a shaft, a bearing in which the shaft is mounted, there being an annular groove between the bearing and the shaft, a force feed blade slidingly mounted in the shaft to project into said groove, a spring for normally holding it outwardly, means for limiting its outward movement, the outer end of said blade being beveled or inclined in a direction outwardly relative to the shaft from its advance side, a cam guide mounted in the bearing and projected into said annular groove, there being a passageway formed in the shaft at a point slightly spaced apart from the force feed blade on the advance side thereof, and means for admitting oil into said groove, said parts being so arranged and combined that when the oil discharge passageways have passed the cam guide, the oil contained in the groove between the cam guide and the force feed blade will be prevented from escaping and will serve to force the force feed blade inwardly into the shaft to prevent its striking upon the cam guide.

Des Moines, Iowa, June 28, 1923.

ROY V. YEAGER.